United States Patent [19]

O'Connor et al.

[11] Patent Number: 4,539,254

[45] Date of Patent: Sep. 3, 1985

[54] REINFORCING COMPOSITE FOR ROOFING MEMBRANES AND PROCESS FOR MAKING SUCH COMPOSITES

[75] Inventors: Terry J. O'Connor; Ian G. Cooper, both of St. Catharines, Canada

[73] Assignee: Bay Mills Limited, St. Catharines, Canada

[21] Appl. No.: 684,116

[22] Filed: Dec. 20, 1984

Related U.S. Application Data

[63] Continuation-in-part of Ser. No. 444,215, Nov. 24, 1982, Pat. No. 4,491,617.

[51] Int. Cl.$^3$ .............................................. B32B 5/06
[52] U.S. Cl. .................................. 428/236; 156/282; 428/247; 428/251; 428/252; 428/253; 428/255; 428/285; 428/287

[58] Field of Search ............... 428/236, 247, 251, 252, 428/253, 255, 285, 287, 288; 156/282

[56] References Cited

U.S. PATENT DOCUMENTS

| 3,940,534 | 2/1976 | Fick | 428/251 |
| 3,993,828 | 11/1976 | McCorsley | 428/251 |
| 4,368,228 | 1/1983 | Gorgati | 428/110 |

FOREIGN PATENT DOCUMENTS 711219 6/1965 Canada ............................... 428/251

Primary Examiner—Marion E. McCamish
Attorney, Agent, or Firm—Fitzpatrick, Cella, Harper & Scinto

[57] ABSTRACT

A reinforcing composite for bituminous roofing membranes is made by laminating fiberglass and polyester mats and scrims coated with selected adhesives.

9 Claims, No Drawings

REINFORCING COMPOSITE FOR ROOFING MEMBRANES AND PROCESS FOR MAKING SUCH COMPOSITES

BACKGROUND OF THE INVENTION

This application is a continuation in part of copending U.S. application Ser. No. 444,215, filed Nov. 24, 1982, now U.S. Pat. No. 4,491,617, issued Jan. 1, 1985.

1. Field of the Invention

This invention relates to a composite for use in reinforcing roofing membranes made from bituminous materials. The use of this invention by manufacturers of such membranes results in significantly easier processing with less-complicated equipment. Moreover, sufficient strength in the roofing membranes can be achieved with less reinforcing material than previously used. The membranes may also be made significantly thinner, which is not only a saving in the amount of bituminous raw material required and a reduction in the weight load on the roof after installation, but also increases flexibility so that handling during installation involves a decreased risk of creating cracks or other weaknesses which could lead to leaks. Furthermore, by proper selection of materials, the membranes can be made relatively stiff or thick, which is desirable in some circumstances.

2. Description of the Prior Art

Asphalt-like roofing membranes, such as those which are used on flat roofs, have been made from bituminous materials reinforced with three separate layers of reinforcing materials: polyester mat, non-woven fiberglass scrim held together with a thermosetting adhesive, and fiberglass mat. Other combinations of separate layers used previously have included (a) polyester mat and fiberglass scrim, (b) fiberglass mat and polyester scrim, and (c) polyester mat and fiberglass scrim. These reinforcing layers have been unwound from their respective separate rolls and led together through a tank or vat of heated bituminous material using methods which are known in the art. We are using "mat" in its usual meaning of an entangled mass of filaments and "scrim" in its usual meaning of an open fabric. The bituminous material has been a "modified bitumen" such as asphalt combined with about 20% by weight of atactic polypropylene or 5 to 15% styrene butadiene styrene rubber. The bituminous material has acted as an adhesive to hold the layers within the membrane. In addition, we have suggested replacing the polyester mat in the combination of polyester mat, fiberglass scrim, and fiberglass mat with a composite polyester layer consisting of a polyester scrim coated with polyvinyl chloride bonded to a light weight polyester mat; we understand that such a roofing membrane has been made and sold for more than a year.

SUMMARY OF THE PRESENT INVENTION

Our invention comprises making a single reinforcing composite of at least one layer of fiberglass, at least one layer of polyester, and at least a third layer which is fiberglass or polyester. Furthermore, these materials may be formed such that at least one of them is in the form of a mat, at least one is in the form of a scrim coated with a thermoplastic adhesive, and at least a third layer is in the form of a mat or a scrim. In addition, as set forth below, we have learned that it is possible to make a composite with advantageous properties for some uses which does not require a scrim with a thermoplastic adhesive.

The words "thermosetting adhesive" are used herein to mean a thermosetting adhesive which maintains its bonding ability and stiffness up to about 425° F., that is to say, a thermosetting adhesive which is not tacky and soft at about 425° F. In accordance with this definition, it will be understood that some thermosetting adhesives, if partially cured, may act as thermoplastic adhesives.

These layers may be bonded together by thermoplastic adhesive under pressure to form a single, thin composite which is useful for reinforcing roofing membranes. Alternatively, they may be bound together using a thermosetting adhesive, which may be applied to a scrim layer and then laminating the other layers to that scrim layer before the adhesive has completely set to form a single composite which is useful for reinforcing roofing membranes.

Our process and the composite made from it have several advantages over the prior art, including the following. By combining the various reinforcing elements as we describe, the thickness and weight of each layer can be reduced because each one need not be self-supporting when it is subjected to stress at the time it is unwound and bituminous material is applied. Moreover, the composites of this invention may have a reduced total thickness for the reinforcing layer, which results in less bituminous material being required. This reduction in material not only cuts costs, but increases ease of handling and reduces roof-loads when installed. The thinner reinforcing membrane and the resulting reduction in overall thickness also gives additional significant advantages beyond reduction in materials and weight. A thinner roofing membrane is less likely to crack or develop weaknesses during installation, which could lead to leaks when it is made into rolls and stored, transported, unrolled, and applied to roofs. This is particularly important in winter in colder climates. A single reinforcing element also results in easier processing for the manufacturer, who need not be concerned with aligning separate reinforcing elements while they are led to and through the vats of hot bituminous material.

When a thermosetting adhesive is used to bind the composite into one layer, the composite has the advantage of being adaptable to a wider variety of processing conditions and equipment than when a thermoplastic resin acts as the binder. In addition, with thermosetting resins it is possible to make thicker and/or stiffer composites, which is desirable in some uses for roofing membranes.

In reinforcing composites of this invention, if two glass components are used, we prefer to place them side by side. Mats are preferably used on the outside of a composite held together by thermoplastic resins, as this tends to prevent scrims from separating in later processing.

Fiberglass has advantageous properties of tensile strength, thermal dimensional stability, and resistance to wear and deterioration such as may be due to ultraviolet light. Polyester mat and scrim provide tear resistance. The scrims used in this invention may be coated with a thermoplastic adhesive such as polyvinyl chloride ("PVC") latex adhesive or PVC plastisol adhesive. Thermoplastic adhesive on the scrim may be used to bind layers of the composite together. Alternatively, when a thermosetting adhesive is used to bind the composite together, the use of a thermoplastic resin on the scrim is not essential; but if it is used to bind the non-woven scrim together, it should be compatible with the thermosetting resin to be used. The scrim used in this invention is preferably a non-woven scrim or a weft-inserted warp knit fabric or other knit fabric, though it may also be woven. We prefer that the fiberglass yarns range from 150 1/0 (15000 yards/pound yield, 330 dtex) to 75 1/0 or heavier, up to 18 1/0 (1,800 yards/pounds yield, 2,640 dtex).

The weight of fiberglass scrim (including any thermoplastic adhesive used to bind it together) we prefer may range from 0.35 ounces per square yard (12 grams/square meter) to 7 ounces per square yard (235 grams/square meter), with weights of about 5 ounces per square yard being optimal. Thermoplastic adhesives when used on fiberglass scrim solely to bind a non-woven scrim together may range in weight preferably from 3 parts (by weight) of adhesive to 100 parts (by weight) of yarn up to 100 parts of adhesive to 100 parts of yarn. When thermoplastic adhesive on a scrim is used to bind the composite together, these adhesives are preferably used in the proportion of 30 parts (by weight) of adhesive to 100 parts (by weight) of yarn up to 250 parts of adhesive to 100 parts of yarn in the scrim.

Polyester scrim (including adhesive) may preferably range in weight between 0.25 ounces per square yard (8.5 grams per square meter) and 5 ounces per square yard (including adhesive) made of threads of 200 to 3000 denier (220 to 3300 dtex), with 500 to 2000 denier (550 dtex to 2200 dtex) being preferable and 1000 denier (1100 dtex) threads being most perferred. The weight of thermoplastic adhesive when used on polyester scrim solely to bind non-woven scrim together may range in weight preferably between 20 and 100 parts (by weight) to 100 parts (by weight) of yarn, with the most preferred range being 25 to 50 parts of adhesive. When thermoplastic adhesive on a scrim is used to bind the composite together these adhesives may range between 30 and 250 parts (by weight) to 100 parts (by weight) of yarn, with the most preferred range being 100 to 160 parts of adhesive.

The weight of thermosetting adhesive when used as a binder for the composite may range between 5 and 100 parts (by weight) to 100 parts (by weight) of yarn, with the preferred range being 25 to 50 parts of adhesive. When an adhesive bonded scrim is used, the weight of the adhesive in the scrim is included in the yarn weight for these calculations.

Preferred thermoplastic adhesives for the fiberglass and polyester non-woven adhesive bonded scrims are polyvinyl chlorides such as PVC plastisol (PVC dispersion in plasticizer), and PVC latex, having melting temperatures ranging from 275° F. (135° C.) to 425° F. (220° C.). Other forms of polymeric resins such as acetates and acrylics may be used, as may other thermoplastic adhesives.

When using a thermosetting adhesive to bind the laminated composite together, the preferred adhesives for both fiberglass and polyester non-woven adhesive bonded scrims are polyvinyl alcohol, polyvinyl chloride latex, styrene butadiene latex, acrylic latex and the water based thermoplastic resins which are capable of later modification by the cross linking components of the thermosetting adhesive. Thermosetting adhesives, which are typically a water-based adhesive capable of cross-linking to give a thermoset structure, may also be made by adding thermosetting resins to thermoplastic resins (for example, by adding a urea-formaldehyde resin to a etyrene-butadiene latex).

The polyester mat may be a paper laid mat of staple filaments or preferably spun bonded of continuous filaments, and preferably having isotropic properties. The weight of the mat per square yard is preferred at 0.4 (14) to 1.0 (34 gm/m$^2$) ounces, though weights up to about 6 ounces per square yard may be used. The fiberglass mat may be formed on a paper machine (by what is known as a wet process), or it may be a resin-bonded (a so-called dry process) staple or continous filament mat and is preferably isotropic. The fiberglass mat may preferably range in weight from 30 grams to 300 grams per square meter, with 30 to 100 grams being more preferred and 30 to 45 considered optimal.

In the process of laminating the various components of the reinforcing composite of this invention using thermoplastic ashesive on a scrim as the laminating adhesive to bind the components together into a single layer, increased strength may be obtained if all components except any fiberglass mat are unrolled and led to a hot nip where heavy pressure is applied and then led to a second hot nip where the fiberglass mat is added using lighter pressure. Alternatively, the fiberglass mat may be added as part of a single pass through a single hot-nip. When using a single hot-nip or the first nip when adding fiberglass mat in a second later step, the nip may consist of a heated steel roll and a resilient roll pressed together to give a working pressure at the nip preferably of 50 to 500 pounds per linear inch ("PLI") with the most preferred range being 150 to 250. A preheating roll may be used. The temperature of the preheat and heated rolls, and the running speed may be adjusted readily by those skilled in the art to obtain maximum adhesion between the various components. The composite may then be cooled by passing it through air or over a water cooled roll and wound for shipment or for further processing to add a fiberglass mat. When added in at second later hot nip, fiberglass mat may preferably be added using comparable temperatures and speeds but the working pressure may preferably be in the range of 25 to 75 PLI. In specifying PLI, we are referring to rolls between 10 and 30 inches in diameter.

In the preferred process of laminating using thermosetting adhesive as the laminating adhesive, the scrim fabric or fabrics are unrolled and fed through an adhesive applicator which typically consists of a steel roll resting above a resilient roll, with the lower roll resting in a tray of adhesive. The resin solids of the thermosetting laminating adhesive, the pressure between the applicator rolls, and the configuration of the fabric passing through the rolls may be adjusted by those skilled in the art to obtain the necessary pick up of adhesive onto the fabric. As the fabric or fabrics leave the adhesive applicator and travel under tension towards a series of steam-heated drying rolls, mat components are fed in above and/or below the scrim fabric or fabrics and all these components then contact one another in traversing a set of at least two and preferably four or more drying rolls, such that both sides of the composite receive direct heat to ensure a good bond on both sides of the structure. The temperature of the heated rolls, and the running speed may be adjusted by those skilled in the art to obtain thorough drying and curing in order to obtain maximum adhesion between the various components. The composites of this invention are suitable for reinforcing a roofing membrane made, for example, by running the reinforcing composite through a tank or vat of hot modified bitumen with thickness controlled by metering rolls or doctor blades. The finished product is suitable for application by hot mopping, torching, cold adhesive, or other appropriate methods. It may be fully adhered, loose laid or mechanically fastened to the roof. The following examples will illustrate the invention.

EXAMPLE 1

Fiberglass scrim having 5×7 yarns per 1 inch (5 yarns in the machine direction and 7 in the cross machine direction) of 37 1/0 fiberglass yarn weighing 2.0 oz/sq. yd. and coated with 0.7 oz/sq. yd. of PVC latex adhesive, polyester scrim having 4×4 yarns/inch of 1000 denier high tenacity polyester yarn weighing 1 oz/sq. yd. and coated with 1.3 oz/sq. yd. of PVC plastisol adhesive, and a contimous filament spunbonded polyester mat weighing 0.6 oz/sq. yd. were unrolled and fed over a preheat roll (at 320° F.), then through a heated nip (380° F.) at 150 PLI.

EXAMPLE 2

A fiberglass mat of 40 grams per square meter, and a fiberglass scrim, polyester scrim, and polyester mat each as described in Example 1, were fed over a preheat roll (at 320° F.), then through a heated nip (380° F.) at 150 PLI.

EXAMPLE 3

Polyester mat and fiberglass scrim as described in Example 1 and fiberglass mat as described in Example 2 were fed over a preheat roll (at 320° F.), then through a heated nip (380° F.) at 150 PLI.

EXAMPLE 4

Polyester mat, fiberglass scrim, polyester scrim, and polyester mat, all as described in Example 1, were fed over a preheat roll (at 320° F.), then through a heated nip (380° F.) at 150 PLI.

EXAMPLE 5

Polyester mat as described in Example 1, fiberglass scrim having 4×2 yarns/inch of 150 1/0 fiberglass yarn in the machine direction and 75 1/0 in the cross-machine direction, weighing 0.3 ounces/sq. yd. and coated with 0.2 oz/sq. yd. of PVC latex adhesive, and a continous filament spunbonded polyester mat weighing 6 oz/sq. yd. were fed over a preheat roll (at 320° F.), then through a heated nip (380° F.) at 150 PLI.

EXAMPLE 6

Polyester mat of Example 1, polyester scrim of Example 1, and fiberglass mat of Example 2 were fed over a preheat roll at 320° F., then through a heated nip at 380° F. and 250 PLI.

EXAMPLE 7

Polyester scrim having 4×4 yarns per inch (1.6×1.6 yarns/cm) of 1000 denier (1100 dtex) high tenacity polyester yarn and coated with 20 parts by weight of polyvinyl alcohol resin to give a total weight of 1.25 ounces per square yard (42 grams per square meter) was in turn coated with an additional 20 parts of cross-linking acrylic latex and the coated fabric brought into contact with a fiberglass mat of 1.45 ounces per square yard (50 grams per square meter) on each side of the polyester fabric. The composite was dried and cured.

EXAMPLE 8

The polyester scrim component mentioned in Example 7, together with a fiberglass scrim having 6×6 yarns per inch (2.4×2.4 yarns per cm.) of 370 (1340 dtex) yarn and coated with 10 parts by weight of polyvinyl alcohol resin to give a total weight of 2.3 ounces per square yard (77 grams per square meter), were in turn coated with an additional 20 parts of cross-linking acrylic latex and the coated fabrics brought into contact with a fiberglass mat of 1.45 ounces per square yard (50 grams per square meter) on the outer side of the coated fabrics. The composite was dried and cured.

EXAMPLE 9

Polyester scrim was coated with acrylic adhesive as described in Example 7 but was laminated with fiberglass mat of 1.45 ounces per square yard (50 grams per square meter) on one side and a continuous filament spunbonded polyester mat weighing 2 ounces per square yard (68 grams per square meter) on the other side. The composite was dried and cured.

EXAMPLE 10

Polyester scrim and fiberglass scrim were coated with acrylic adhesive as described in Example 8 but were laminated with a fiberglass mat of 1.45 ounces per square yard (50 grams per square meter) on one side and a continuous filament spunbonded polyester mat weighing 1 ounce per square yard (32 grams per square meter) on the other side. The composite was dried and cured.

EXAMPLE 11

Polyester scrim and fiberglass scrim were coated with acrylic resin as described in Example 8 but were laminated with a polyester mat of 1 ounce per square yard (32 grams per square meter) on the outsides of the coated fabrics. The composite was dried and cured.

EXAMPLE 12

Fiberglass scrim having 6×6 yards per inch (2.4×2.4 yarns per cm.) of 37 1/0 (1340 dtex) yarn and coated with 10 parts by weight of polyvinyl alcohol to give a total weight of 2.3 ounces per square yard (77 grams per square meter) was in turn coated with an additional 20 parts of cross-linking acrylic latex and the fabric brought into contact with a fiberglass mat of 1.45 ounces per square yard (50 grams per square meter) on one side and a continuous filament spunbonded polyester mat weighing 2 ounces per square yard (68 grams per square meter) on the other side. The composite was dried and cured.

In each of the above examples the process produced a reinforcing, impregnatable composite for use in roofing membranes.

EXAMPLE 13

A composite of polyester scrim and polyester mat was combined with a fiberglass scrim using a hot nip, the composite being thinner and having a lighter weight than the three elements as used separately in the prior art. The roofing membrane was made by unrolling this composite and a fiberglass mat from two separate rolls and leading them together through a tank of hot modified bitumen.

We claim:

1. A composite for reinforcing roofing membranes comprising three or more layers bonded together with a thermosetting resin one of which layers is made of fiberglass, one of which is made of polyester, and the third of which is made of either polyester or fiberglass; further, at least one of which is in the form of a scrim, one of which is in the form of a mat, and a third of which is in the form of a mat or a scrim; wherein the composite is flexible, capable of being impregnated by a bitumenous material, and has sufficient strength to be useful in reinforcing membrances.

2. The composite of claim 1 in which the layers are two fiberglass mats and a polyester scrim.

3. The composite of claim 1 in which the layers are two fiberglass mats, a polyester scrim, and a polyester mat.

4. The composite of claim 1 in which the layers are a polyester mat, a polyester scrim, and a fiberglass mat.

5. The composite of claim 1 in which the layers are a fiberglass mat, a fiberglass scrim, a polyester scrim, and a polyester mat.

6. The composite of claim 1 in which the layers are two polyester mats, a fiberglass scrim, and a polyester mat.

7. The composite of claim 1 in which the layers are a fiberglass mat, a polyester scrim, and a fiberglass scrim.

8. A process for making a composite to use in reinforcing roofing membranes comprising the steps of;
   selecting at least three materials, one of which is fiberglass, one of which is polyester, and the third of which is fiberglass or polyester; one of which is in the form of a scrim, one of which is the form of a mat, and the third of which is in the form of either a mat or a scrim;
   applying to at least one scrim a coating of thermosetting adhesive;
   combining the other selected materials with said scrim before the adhesive has fully set; and
   thereafter causing the adhesive to set further, thus binding the materials together into a composite; and
   cooling the composite thus created;
   wherein the resulting composite is flexible, capable of being impregnated by bitumenous material, and has sufficient strength to be useful in reinforcing roofing membranes.

9. The process of claim 8 in which the adhesive is a water-based cross linkable adhesive and the materials after being combined are passed over heated rollers which cause drying and setting of the adhesive.

* * * * *